US010621760B2

(12) United States Patent
Fisher et al.

(10) Patent No.: US 10,621,760 B2
(45) Date of Patent: Apr. 14, 2020

(54) SYNTHESIZING NEW FONT GLYPHS FROM PARTIAL OBSERVATIONS

(71) Applicant: Adobe Inc., San Jose, CA (US)

(72) Inventors: Matthew David Fisher, San Francisco, CA (US); Samaneh Azadi, El Cerrito, CA (US); Vladimir Kim, Seattle, WA (US); Elya Shechtman, Seattle, WA (US); Zhaowen Wang, San Jose, CA (US)

(73) Assignee: Adobe Inc., San Jose, CA (US)

(*) Notice: Subject to any disclaimer, the term of this patent is extended or adjusted under 35 U.S.C. 154(b) by 0 days.

(21) Appl. No.: 16/010,110

(22) Filed: Jun. 15, 2018

(65) Prior Publication Data
US 2019/0385346 A1 Dec. 19, 2019

(51) Int. Cl.
G06T 11/20 (2006.01)
(52) U.S. Cl.
CPC ................. G06T 11/203 (2013.01)
(58) Field of Classification Search
None
See application file for complete search history.

(56) References Cited

PUBLICATIONS

Baluja, S., "Learning Typographic Style", arXiv preprint arXiv:1603. 04000, Mar. 13, 2016, 17 pages.
Campbell, N.D. and J. Kautz, "Learning a Manifold of Fonts", ACM Transactions on Graphics (TOG), 2014, vol. 33, 11 pages.
Chang, J. and Y. Gu, "Chinese Typography Transfer", arXiv preprint arXiv:1707.04904, Jul. 16, 2017, 7 pages.
Dai, A. et al., "Shape Completion using 3D-Encoder-Predictor CNNS and Shape Synthesis", Proc. Computer Vision and Pattern Recognition (CVPR), IEEE, 2017, 10 pages.
Flynn, J. et al., "DeepStereo: Learning to Predict New Views from the World's Imagery", arXiv preprint arXiv:1506.06825, Jun. 22, 2015, 9 pages.
Gatys, L.A. et al., "Image Style Transfer Using Convolutional Neural Networks", In Proceedings of the IEEE Conference on Computer Vision and Pattern Recognition, 2016, pp. 2414-2423.
Goodfellow, I. et al., "Generative Adversarial Nets", In Advances in Neural Information Processing Systems, 2014, 9 pages.
Huang, H. et al., "Analysis and Synthesis of 3D Shape Families via Deep-Learned Generative Models of Surfaces", Eurographics Symposium on Geometry Processing, 2015, vol. 34, 26 pages.
Huang, X. and S. Belongie, "Arbitrary Style Transfer in Real-Time with Adaptive Instance Normalization", ICLR, 2017, 6 pages.
Isola, P. et al., "Image-to-Image Translation with Conditional Adversarial Networks", arXiv preprint arXiv:1611.07004, Nov. 22, 2017, 17 pages.
Johnson, J. et al., "Perceptual Losses for Real-Time Style Transfer and Super-Resolution", In European Conference on Computer Vision, 2016, Springer, 17 pages.

(Continued)

Primary Examiner — Yi Wang
(74) Attorney, Agent, or Firm — Finch & Maloney PLLC

(57) ABSTRACT

Techniques are disclosed for the synthesis of a full set of slotted content, based upon only partial observations of the slotted content. With respect to a font, the slots may comprise particular letters or symbols or glyphs in an alphabet. Based upon partial observations of a subset of glyphs from a font, a full set of the glyphs corresponding to the font may be synthesized and may further be ornamented.

16 Claims, 18 Drawing Sheets

(56) References Cited

PUBLICATIONS

Kalantari, N.K. et al., "Learning-Based View Synthesis for Light Field Cameras", ACM Transactions on Graphics (Proceedings of SIGGRAPH Asia 2016), 2016, 10 pages.

Kalogerakis, E. et al., "A Probabilistic Model of Component-Based Shape Synthesis", ACM Transactions on Graphics, Jul. 2012, 13 pages.

Kulkarni, T.D. et al., "Deep Convolutional Inverse Graphics Network", arXiv preprint arXiv:1503.03167, Jun. 22, 2015, 10 pages.

Li, C. and M. Wand, "Combining Markov Random Fields and Convolutional Neural Networks for Image Synthesis", arXiv preprint arXiv:1601.014589, Jan. 18, 2016, 9 pages.

Li, C. and M. Wand, "Precomputed Real-Time Texture Synthesis with Markovian Generative Adversarial Networks", arXiv preprint arXiv:1604:04382, Apr. 15, 2016, 17 pages.

Li, Y. et al., "Universal Style Transfer via Feature Transforms", arXiv preprint arXiv:1705.08086, Nov. 17, 2017, 11 pages.

Lian, Z. et al., "Automatic Generation of Large-scale Handwriting Fonts via Style Learning", ACM Transactions on Graphics (SIGGRAPH Asia 2016 Technical Briefs), Dec. 2016, 4 pages.

Liao, J. et al., "Visual Attribute Transfer through Deep Image Analogy", arXiv preprint arXiv:1705.01088, Jun. 6, 2017, 16 pages.

Lun, Z. et al., "Functionality Preserving Shape Style Transfer", ACM Transactions on Graphics, 2016, 14 pages.

Lyu, P. et al., "Auto-Encoder Guided GAN for Chinese Calligraphy Synthesis", arXiv preprint arXiv:1706.08789, Jun. 27, 2017, 6 pages.

Mao, X. et al., "Least Squares Generative Adversarial Networks", ICCV, 2016, 9 pages.

Mirza M. and S. Osindero, "Conditional Generative Adversarial Nets", arXiv preprint arXiv:1411.1784, Nov. 6, 2014, 7 pages.

Park, E. et al,. "Transformation-Grounded Image Generation Network for Novel 3D View Synthesis", arXiv preprint arXiv:1703.02921, Mar. 8, 2017, 17 pages.

Pathak, D. et al., "Context Encoders: Feature Learning by Inpainting", arXiv preprint arXiv:1604.07379, Nov. 21, 2016, 12 pages.

Phan, H.Q. et al., "FlexyFont: Learning Transferring Rules for Flexible Typeface Synthesis", Computer Graphics Forum, 2015, vol. 34, 12 pages.

Sung, M. et al., "Data-Driven Structural Priors for Shape Completion", Transactions on Graphics (Proceedings of SIGGRAPH Asia 2015), 2015, 11 pages.

Suveeranont, R. and T. Igarashi, "Example-Based Automatic Font Generation", In Smart Graphics, Springer, 2010, 12 pages.

Tenenbaum, J.B. and W.T. Freeman, "Separating Style and Content", In Advances in neural information processing systems, 1997, 7 pages.

Tran, L. et al., "Disentangled Representation Learning GAN for Pose-Invariant Face Recognition", In CVPR, 2017, vol. 4, 10 pages.

Upchurch, P. et al., "From A to Z: Supervised Transfer of Style and Content Using Deep Neural Network Generators", arXiv preprint arXiv:1603.02003, Mar. 7, 2016, 11 pages.

Yang, S. et al., "Awesome Typography: Statistics-Based Text Effects Transfer", arXiv preprint arXiv:1611.09026, Dec. 6, 2016, 22 pages.

Zhao, B. et al., "Multi-View Image Generation from a Single-View", arXiv preprint arXiv:1704.04886, Feb. 27, 2017, 9 pages.

Zhou, T. et al., "View Synthesis by Appearance Flow", arXiv preprint arXiv:1605.03557, Feb. 11, 2017, 16 pages.

Zhu, J.Y. et al., "Unpaired Image-to-Image Translation using Cycle-Consistent Adversarial Networks", ICCV, 2017, 10 pages.

Zhao, B. et al., "Multi-View Image Generation from a Single-View", arXiv preprint arXiv:1704.048864, Feb. 27, 2018, 9 pages.

FIG. 3A

ABCDEFGHIJKLMNOPQRSTUVWXYZ
ABCDEFGHIJKLMNOPQRSTUVWXYZ
ABCDEFGHIJKLMNOPQRSTUVWXYZ
ABCDEFGHIJKLMNOPQRSTUVWXYZ
ABCDEFGHIJKLMNOPQRSTUVWXYZ
ABCDEFGHIJKLMNOPQRSTUVWXYZ

SYNTHESIZING NEW FONT GLYPHS FROM PARTIAL OBSERVATIONS

FIELD OF THE DISCLOSURE

This disclosure relates to techniques for deep learning and deep neural networks. In particular, this disclosure relates to a neural network architecture and methods for automatically synthesizing missing glyphs from a few glyph examples using a conditional generative adversarial network model.

BACKGROUND

Text is a prominent visual element of 2D design. Artists invest significant time in designing glyphs that are visually compatible with other elements in their shape and texture. In typography, a glyph is an elemental symbol within an agreed set of symbols, intended to represent a readable character for the purposes of writing. A font may be comprised of a set of glyphs, each glyph corresponding to a particular symbol in an alphabet. For example, a font comprises a set of glyphs for each character in the alphabet. Each glyph has a specific shape and potential ornamentation and coloring. The glyphs comprising a font (shapes and coloring) distinguish one font from another.

However, this process is labor intensive and artists often design only the subset of glyphs that are necessary for a title or an annotation, which makes it difficult to alter the text after the design is created or to transfer an observed instance of a font to another project.

Early research on glyph synthesis focused on geometric modeling of outlines, which is limited to particular glyph topology (e.g., cannot be applied to decorative or hand-written glyphs) and cannot be used with image input. With the rise of deep neural networks, however, researchers have looked at modeling glyphs from images. These approaches have met with limited success. In particular, known approaches for glyph synthesis adopted approaches in which a single glyph is generated at a time. However, the quality of the generated glyphs using these types of approaches have exhibited limited quality and consistency of the generated glyphs across a font. In addition, some recent texture transfer techniques directly leverage glyph structure as a guiding channel to improve the placement of decorative elements. While this approach provides good results on clean glyphs it tends to fail on automatically-generated glyphs, as the artifacts of the synthesis procedure make it harder to obtain proper guidance from the glyph structure.

Thus, techniques are necessary for generating a full set of glyphs for a font from partial observations in which the generated glyphs are of high quality and internally consistent with respect to other glyphs in the font.

BRIEF DESCRIPTION OF THE DRAWINGS

FIG. 3A shows a few exemplar fonts in greyscale from the dataset according to one embodiment of the present disclosure.

FIG. 3B shows a few examples of ornamented fonts according to one embodiment of the present disclosure.

Figure 4A:
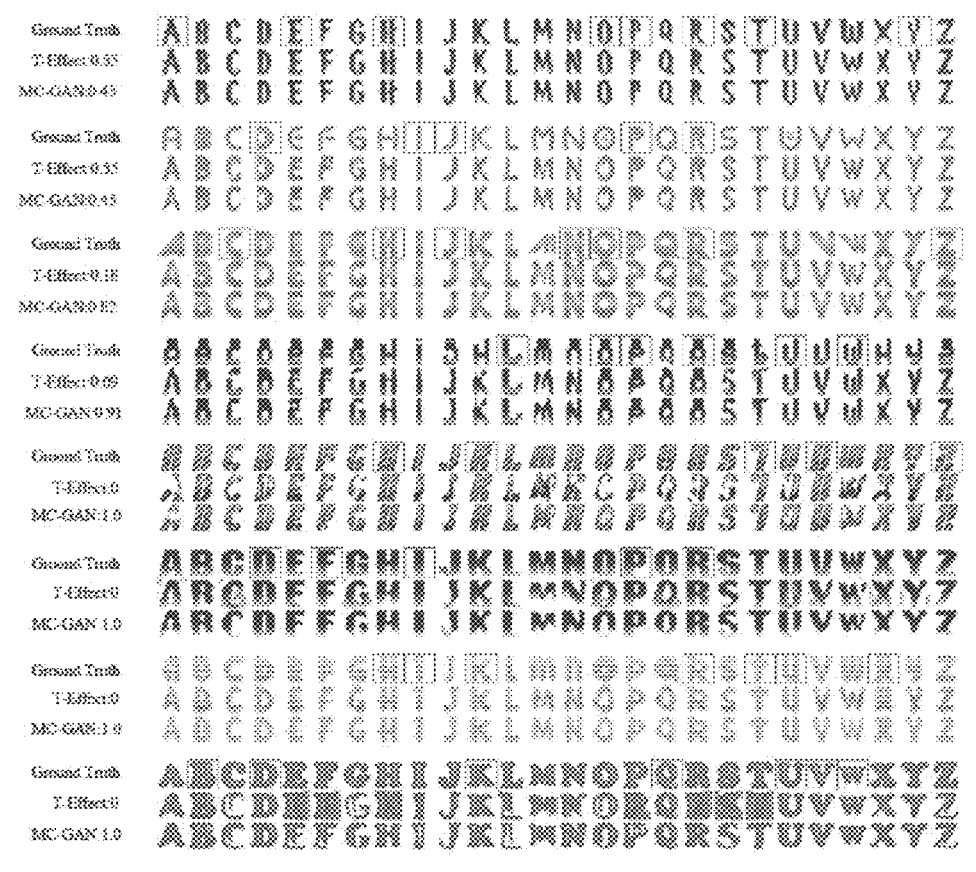
Figure 4C:
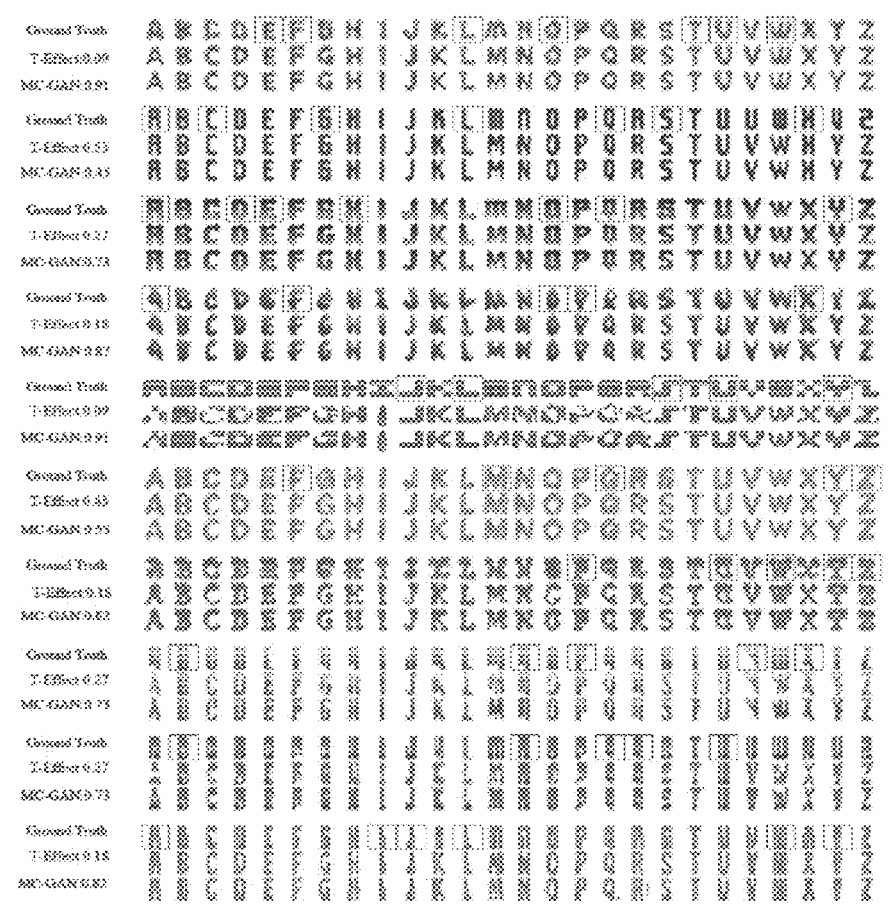
Figure 4D:
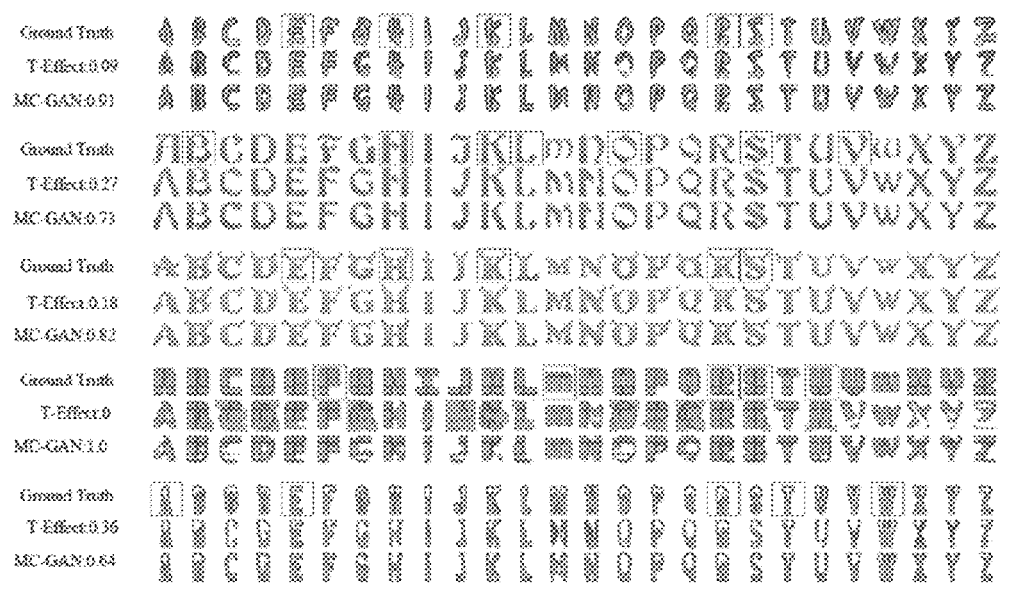

FIGS. 4A through 4D visualize the comparison of a MC-GAN model (according to an embodiment of the present disclosure) with a text-transfer method on a set of examples.

DETAILED DESCRIPTION

Figure 1A:
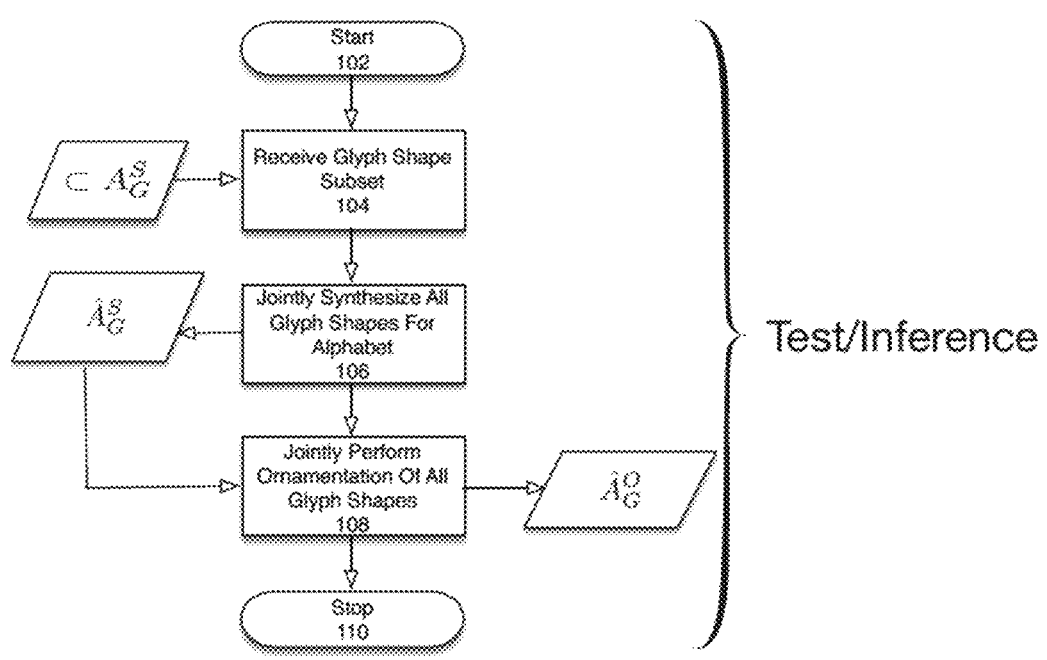
FIG. 1A is a flowchart depicting an operation of a multi-content generative adversarial network (MC-GAN) at test or inference time according to one embodiment of the present disclosure.

Techniques are disclosed for the synthesis of a full set of slotted content, based upon only partial observations of the slotted content. As used in this disclosure, "slotted content" refers to any content that may be organized as a set of positions, wherein each position is associated with a particular type. For example, with respect to a font, the slots may comprise particular letters, symbols, or glyphs in an alphabet. For purposes of this disclosure, the term "alphabet" will refer to the range of characters or glyphs (i.e., letters, numbers, special characters, etc.) in a font. Other examples of slotted content include emojis or clip-art, wherein in the former case each slot may correspond to a particular facial expression or sentiment, and in the latter case each slot may correspond to a particular type of image or art expression. Any character or symbol or mark in a given set or alphabet or other slotted content may generally be referred to herein as a glyph or an ornamented glyph.

It will be understood that a neural network receives an input, processes that input and generates an output. For purposes of the present disclosure, the term "observation" will refer to the input provided to the neural network in the sense that the neural network is effectively "observing" an input and generating an output. The term "partial observations" refers to the fact that only a portion of the slotted content is observed (e.g., only a few glyphs corresponding to a subset of letters from an alphabet). For example, in contrast, if the slotted content were a "full observation,"

each and every glyph in an associated alphabet would be "observed" or provided as input to the neural network. Typically, it is desired to generate a full set of entities corresponding to the slotted content (i.e., content pertaining to each unobserved slot). The unobserved slots can be viewed as holes or missing information.

Known techniques for synthetic generation of glyphs are typically performed one character at a time. As previously noted, recent texture transfer techniques directly leverage glyph structure as a guiding channel to improve the placement of decorative elements. While this approach provides good results on clean glyphs it tends to fail on automatically-generated glyphs, as the artifacts of the synthesis procedure make it harder to obtain proper guidance from the glyph structure. So, it is thereby desirable to generate an entire set of glyphs at one time in which the synthesis process can draw upon the full scope of information across all characters in the font. However, in many instances the full set of glyphs is not available. Thus, the ability to generate a full set of ornamented glyphs from a partial observation as variously provided herein can be beneficial.

According to one embodiment of the present disclosure, slotted content may be a character font whereby the glyphs in the font comprise the slotted content. In this context, the partial observations may comprise a subset of all the glyphs comprising a font. As previously noted, the term "partial observations" refers to the fact that only a subset of the glyphs for an alphabet are provided as input to the neural network as opposed to the full set of glyphs for an alphabet. For example, according to one embodiment of the present disclosure, an entire set of glyphs for a font may be synthesized from observations of a partial subset of the glyphs for that font (e.g., only the letters 'T', 'O', 'W', 'E' and 'R'). If, instead, a "full observation" were provided, each and every character in the alphabet 'A'-'Z' would be provided as input to the neural network.

Generating a full set of ornamented glyphs from a partial observation as herein defined, presents many technical challenges. According to one embodiment of the present disclosure, these technical challenges are solved by utilizing two separate networks, one for generation of shapes (GlyphNet) and the other for ornamentation (OrnaNet). The networks are trained using an adversarial loss function in conjunction with a set of L2 and L1 loss functions to enforce various conditions relating to the ground truth of the training set. These architectural and training features facilitate the network's functioning to generate a full set of ornamented glyphs from partial observations as herein defined.

According to one embodiment of the present disclosure, a deep learning architecture is trained using a large number of fonts. During a training process a set of training examples comprising partial observations is generated from a set of fonts. According to one such embodiment, each training example is a partial observation, which may comprise a subset of characters from an alphabet and a ground truth label, which is the complete set of glyph characters in black and white format.

A high-level overview of the deep learning process will now be described. At inference time, a subset of glyphs from a particular font is received. Based upon this input, all the glyphs from the alphabet corresponding to the input font are jointly generated in black and white format. The generated set of glyphs are then ornamented (e.g., colorized) to generate a final glyph font.

According to one embodiment of the present disclosure, the deep neural network architecture is utilized to automatically synthesize missing glyphs from a few image examples. In particular, according to one such embodiment, a conditional generative adversarial network ("cGAN") architecture is utilized to retrain a customized network for each observed character set using only a handful of observed glyphs.

According to some embodiments, the deep neural network operates in two stages, each stage having an associated network portion, to automatically synthesize glyphs. In a first stage herein referred to as glyph shape synthesis, an overall glyph shape is modeled. In a second stage herein referred to as glyph ornamentation, the synthesis of the final appearance of the synthesized glyphs is performed whereby color and texture is introduced enabling transfer of fine decorative elements. The first stage can be implemented as a glyph generation network, and the second stage can be implemented as an ornamentation network.

According to some such embodiments, the ornamentation network is jointly trained with the glyph generation network allowing an ornament synthesis process to learn how to decorate automatically generated glyphs with color and texture and also fix issues that arise during glyph generation.

According to some embodiments, all glyphs for a font are synthesized simultaneously. The simultaneous generation results in significantly higher quality glyphs compared with previous approaches where a single glyph is generated at a time. This approach of simultaneously generating all glyphs requires a specific training operation, which will be described below.

Numerous configurations will be appreciated in light of this disclosure. For instance, in one specific embodiment, new font glyphs are synthesized from partial observations (from the point of view of the GlyphNet as the observer) by utilizing a glyph generation phase followed by a texture transfer phase. In particular, the glyph generation phase is performed by a first network, herein referred to as "GlyphNet" while the texture transfer phase (second phase) is performed by a second network, herein referred to as "OrnaNet" (ornamentation). Based upon the processing of a partial set of observed glyph masks, GlyphNet may predict a full set of glyph masks which are then provided as input to OrnaNet. OrnaNet may process the predicted full set of glyph masks generated by GlyphNet by performing fine-tuning, coloring and ornamentation of the generated glyphs.

According to some such embodiments, GlyphNet and OrnaNet may be combined as subnetworks in a composite network herein referred to as "MC-GAN" ("Multi-Content Generative Adversarial Network"), which comprises an end-to-end network for synthesizing new font glyphs from partial observations, wherein as previously noted, GlyphNet and OrnaNet serve as observers. According to one such embodiment, both GlyphNet and OrnaNet utilize a cGAN network architecture that is adapted for the purpose of styling glyphs or ornamentation prediction. Other embodiments will be appreciated.

FIG. 1A is a flowchart depicting an operation of an MC-GAN at test or inference time according to one embodiment of the present disclosure. Techniques for training an MC-GAN as well as an example structure of an MC-GAN will be described in detail below. The process shown in FIG. 1A may operate to receive a partial set of glyphs (observed glyphs) as input and generate a complete set of ornamented glyphs (i.e., all glyphs in an alphabet) for a particular font as follows:

$$\subset A_G^S \rightarrow \hat{A}_G^O$$

The following notation conventions are observed. A refers to an alphabet. The superscript S or O refers to shapes or ornamented respectively. Hatted variables refer to entities generated by the MC-GAN network (either GlyphNet or OrnaNet). Thus, for example, $A_G^S$ comprises the full set of glyph shapes for an alphabet. For purposes of the present disclosure, the term glyph shape refers to the shape or mask of a particular glyph absent any style or color information.

Referring to FIG. 1A, the process is initiated in 102. In 104, a subset of glyph shapes $$\subset A_G^S$$

corresponding to a font are received as input. The subset of glyph shapes may be a subset of glyphs in an alphabet (A) associated with the font. It will be understood that an alphabet refers to the entire set of symbols in a particular context. For example, in certain contexts an alphabet may comprise both uppercase and lowercase characters while in other instances an alphabet may comprise only lowercase characters for example. In yet other contexts, an alphabet may comprise not only characters but also numerals and other special symbols. The input glyph shapes are herein referred to as the observed glyphs while the missing shapes from the alphabet are herein referred to as the unobserved glyph shapes.

According to one embodiment of the present disclosure, a glyph shape may comprise black-and-white pixel data or greyscale pixel data of a glyph. Further, an input glyph shape may be derived from color image data of a fully stylized/colorized glyph using an appropriate transformation. In particular, according to one embodiment the present disclosure, color image data for a glyph may be converted to grayscale image data. Subsequently, a downsampling operation may be performed on the greyscale image to accommodate a particular desired image size. According to one embodiment of the present disclosure, the unobserved glyph shapes may be populated with blank data (e.g., 0's).

For example, according to one embodiment of the present disclosure, the glyph shapes corresponding to the letters 'T', 'O', 'W', 'E' and 'R', which comprise a subset of the entire alphabet 'A'-'Z' may be received. Based upon these 5 glyph shapes a full set of ornamented glyphs for the entire alphabet may be generated.

In 106, all glyph shapes for the alphabet are jointly synthesized from the subset of glyph shapes received in 104. In particular:

$$\subset A_G^S \rightarrow \hat{A}_G^S$$

According to one embodiment of the present disclosure, a full set of glyph shapes is generated from partial observations using a GlyphNet network. An example structure and function of a GlyphNet is described below. However, for purposes of the present discussion, it is sufficient to recognize that a GlyphNet may comprise a cGAN utilizing an adversarial loss function, which may be utilized in conjunction with other loss functions.

In 108, a full set of ornamented glyphs for the alphabet is jointly synthesized from the set full set of glyph shapes generated in 106 as follows:

$$\hat{A}_G^S \rightarrow A_G^O$$

According to one embodiment of the present disclosure, the ornamentation of glyph shapes may be performed by an OrnaNet, which is described in detail below. The process ends in 110.

Figure 1B:
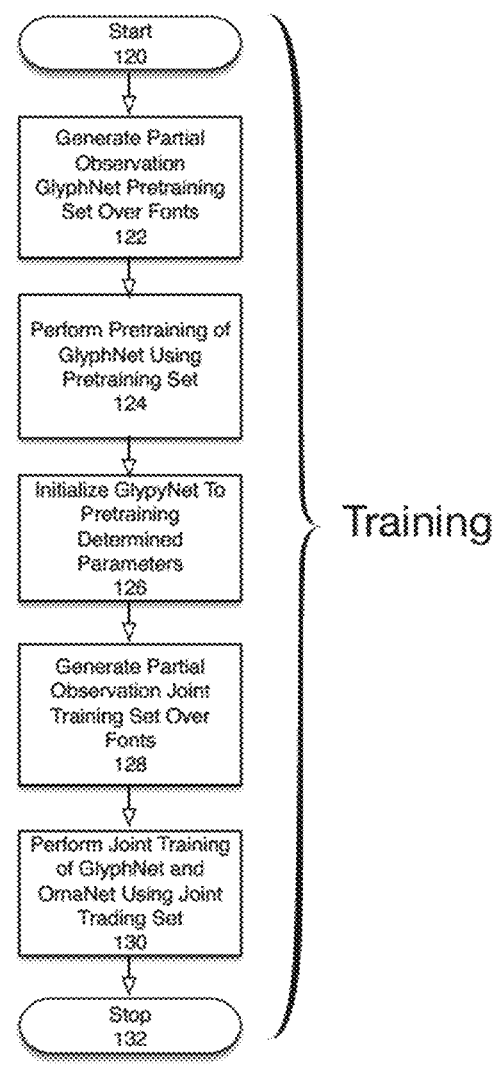
FIG. 1B is a flowchart depicting a training process for an MC-GAN according to one embodiment of the present disclosure.

FIG. 1B is a flowchart depicting a training process for an MC-GAN according to one embodiment of the present disclosure. The process is initiated in 120. In 122, a partial observation GlyphNet pre-training set over a set of fonts is generated. A process for generating a partial observation GlyphNet pre-training set is described below with respect to FIG. 1C. For purposes of the present disclosure, it will be sufficient to recognize that each training example in a partial observation GlyphNet pre-training set may comprise some arbitrary number of observed glyph shapes from a selected font and a remainder of shapes corresponding to the unobserved glyphs as blank (i.e., 0's). According to one embodiment of the present disclosure, each training example may be generated from a different font. That is, for each training example, each set of observed glyph shapes may be generated from a randomly selected font. In 124, a pretraining process is performed on the GlyphNet using the training set determined in 122. It will be recognized that the training process will learn a set of parameters for the network. It will be understood that the learned parameters may comprise weights and biases for multilayer perceptron portions of the network, convolutional kernels for convolutional portions of the network or other parameters. As previously mentioned, the structure of a GlyphNet and associated loss functions will be described below. For purposes of the present disclosure, it is sufficient to recognize that the pre-training process may utilize a backpropagation algorithm coupled with gradient descent.

In 126, the GlyphNet will be initialized with the parameters determined in the pretraining step (124). In 128, a partial observation joint training set will be generated over the set of fonts. In 130, a joint training process will be performed on a composite network of a GlyphNet and a OrnaNet (MC-GAN) using the partial observation joint training set generated in 128. The structure of an MC-GAN network will be described below. For purposes of the present disclosure, it will be sufficient to recognize that the MC-GAN network may utilize one or more cGAN architecture coupled with additional loss functions. The joint training of the MC-GAN network will perform further refinement of the parameters of the GlyphNet determined in 124 as well as the final parameters of the OrnaNet network. The process ends in 132.

Figure 1C:
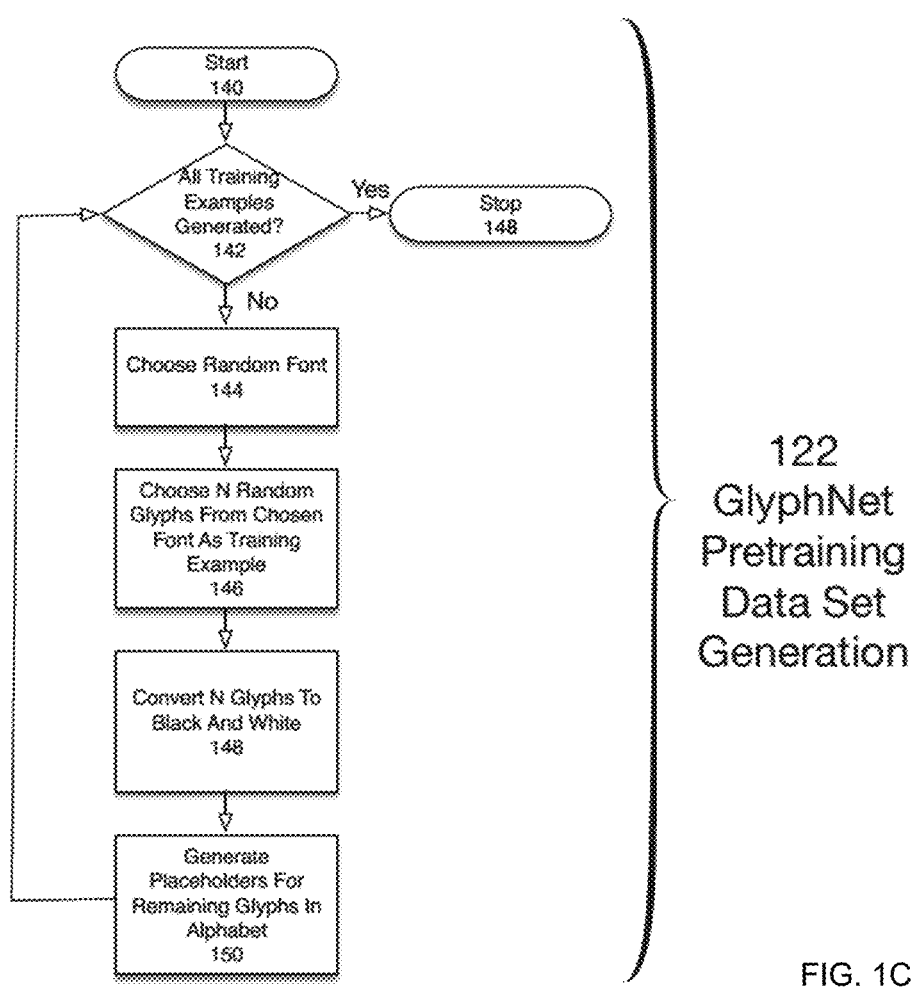
FIG. 1C is a flowchart depicting a process for generating a GlyphNet pre-training set according to one embodiment of the present disclosure.

FIG. 1C is a flowchart depicting a process for generating a GlyphNet pre-training set according to one embodiment of the present disclosure. The process is initiated in 140. In 142, it is determined whether all training examples have been generated. If so ('Yes' branch of 142), the process ends in 148. If not ('No' branch of 142), flow continues with 144 in which a random font is selected. According to one embodiment of the present disclosure, the pre-training set may be generated from an arbitrary number of existing fonts (e.g., 10000). In 146, an arbitrary number of random glyphs are selected from the chosen font. The number of random glyphs may be fixed for each training example or may be selected at random for each training example. For example, according to one embodiment the glyphs corresponding to the letters 'T', 'O', 'W', 'E' and 'R' may be selected for a particular font. As typically the set of fonts utilized to generate training examples may be ornamented (stylized and colored fonts comprising color image data), in 148, the glyphs selected in 146 may be converted to black and white images. According to one embodiment of the present disclosure, the glyphs may be first converted to greyscale rather than pure black and white images. In this case, according to one embodiment the N glyphs selected for each training example may be greyscale images. In 150, placeholders for the remaining glyphs in the alphabet are generated. For example, if the glyphs corresponding to the letters 'T', 'O', 'W', 'E' and 'R' were selected in 146, in 150, placeholders for the remaining characters in the alphabet (i.e., 'A'-'D', 'F'-'N', 'P'-'Q' and 'S'-'Z') are generated. According to one embodiment of the present disclosure, the placeholders may comprise 0's for the image data. Flow then continues with 142.

Generative Adversarial Networks

Deep learning attempts to discover rich, hierarchical models that represent probability distributions over the kinds of data encountered in artificial intelligence applications, such as natural images, audio waveforms containing speech, and symbols in natural language corpora. Many early successes in deep learning have involved discriminative models, usually those that map a high-dimensional, rich sensory input to a class label. These early successes have primarily been based on the backpropagation and dropout algorithms, using piecewise linear units which have a particularly well-behaved gradient. Deep generative models had less of an impact, due to the difficulty of approximating many intractable probabilistic computations that arise in maximum likelihood estimation and related strategies, and due to difficulty of leveraging the benefits of piecewise linear units in the generative context. GANs solved some of these problems by introducing a generative model estimation procedure that sidestepped many of these difficulties.

In the GAN framework, a generative model is pitted against an adversary. In particular, a discriminative model learns to determine whether a sample is from the model distribution or the data distribution. The generative model can be thought of as analogous to a team of counterfeiters, trying to produce fake currency and use it without detection, while the discriminative model is analogous to the police, trying to detect the counterfeit currency. Competition in this game drives both teams to improve their methods until the counterfeits are indistinguishable from the genuine articles.

To learn the generator's distribution $p_g$ over data x, a prior is defined on input noise variables $p_z(z)$. A mapping to data space $G(z,\theta_g)$ is then defined where G is a differentiable function represented by a multilayer perceptron with parameters $\theta_g$. A second multilayer perceptron D $(x,\theta_d)$ is then defined that outputs a single scalar. D (x) represents the probability that x came from the data rather than $p_g$. D is then trained to maximize the probability of assigning the correct label to both training examples and samples from G. Simultaneously, G is trained to minimize log(1−D(G(z)). Effectively, D and G play the following two-player minimax game with value function V(G,D):

$$\min_G \max_D V(G, D) = \mathbb{E}_{x \sim p_{data}(x)} \log[D(x)] + \mathbb{E}_{z \sim p_z(z)}[1 - \log[D(G(z))]$$

Conditional Generative Adversarial Networks

Generative adversarial nets can be extended to a conditional model if both the generator and discriminator are conditioned on some extra information y. y may be any kind of auxiliary information, such as class labels or data from other modalities. The conditioning may be performed by feeding y into the both the discriminator and generator as an additional input layer. In the generator, the prior input noise $p_z(z)$, and z are combined in joint hidden representation, and the adversarial training framework allows for considerable flexibility in how this hidden representation is composed. In the discriminator x and y are presented as inputs and to a discriminative function (embodied by an MLP ("Multilayer Perceptron") in this case). The objective function of a two-player minimax game using the cGAN framework may be expressed as:

$$\min_G \max_D V(G, D) = \mathbb{E}_{x \sim p_{data}(x)} \log[D(x|y)] + \mathbb{E}_{z \sim p_z(z)}[1 - \log[D(G(z|y))]$$

MC-GAN Model

According to one embodiment of the present disclosure, an MC-GAN model may comprise two subnetworks: a GlyphNet to synthesize glyph shapes and an OrnaNet to perform synthetic ornamentation of glyph shapes generated by a GlyphNet. As will be described in more detail below, a GlyphNet and OrnaNet comprising an MC-GAN model may each respectively utilize a cGAN model during training. With respect to generation of synthetic images, starting from a random noise vector z, GANs train a model to generate an image y, following a specific distribution by adversarially training a generator versus a discriminator (z→y). While the discriminator attempts to discriminate between real and fake images, the generator opposes the discriminator by trying to generate realistic looking images. In the conditional (cGAN) scenario, this mapping is modified by feeding an observed image x alongside the random noise vector to the generator ({x,z}→y). According to one embodiment of the present disclosure, the adversarial process between a generator and discriminator may be formulated as the following loss function:

$$\mathcal{L}_{cGAN}(G,D) = \mathbb{E}_{x,y \sim p_{data}(x,y)} \log [D(x,y)] + \mathbb{E}_{x,y \sim p_{data}(x,y), z \sim p_z(z)}[1 - \log [D(x, G(x,z))]$$

Here G and D minimize and maximize this loss function respectively.

Given the ground truth output of the generator, it is also beneficial to force the model to generate images which are close to their targets through an $L_1$ loss function in addition to fooling the discriminator. According to one embodiment of the present disclosure, the generator's objective can be summarized as follows:

$$G^* = \arg\min_G \max_D \mathcal{L}_{cGAN}(G, D) + \lambda \mathcal{L}_{L1}(G)$$

where $$\mathcal{L}_{L_1}(G) = \mathbb{E}_{x,y \sim p_{data}(x,y), z \sim p_z(z)}[\|y - (x, z)\|_1]$$

As will be described in more detail below, according to one embodiment of the present disclosure, this cGAN model is invoked by setting each of the subnetworks (GlyphNet and OrnaNet) to generate the entire set of letters for an alphabet by observing only a few examples fed in as a stack, x. According to one embodiment of the present disclosure, random noise is ignored as an input to the generator and dropout is the only source of randomness in the network.

MC-GAN Test/Inference Architecture

Figure 2A:
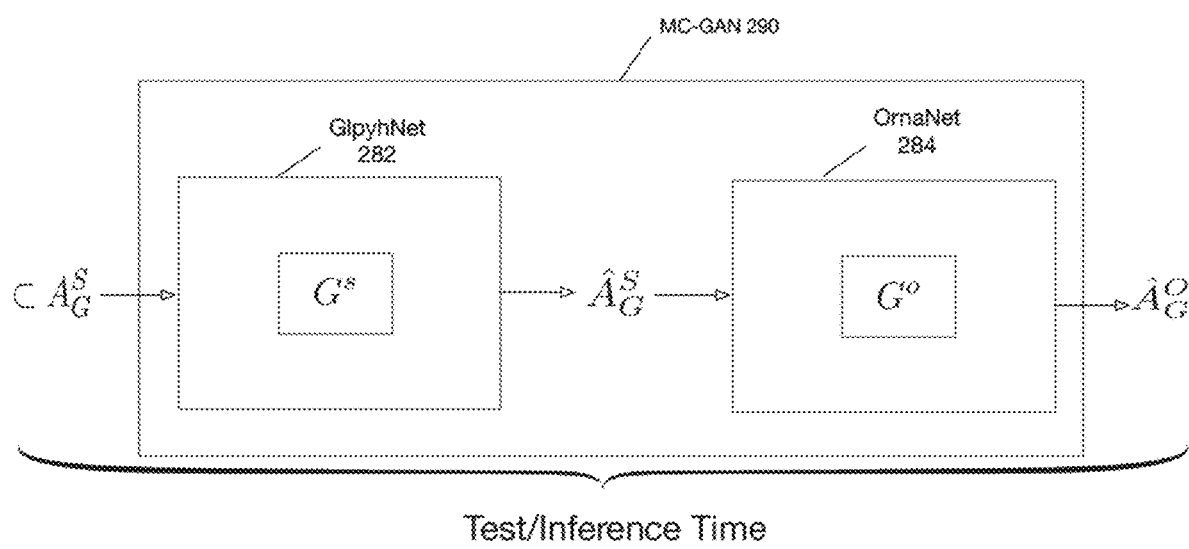
FIG. 2A is a block diagram of an MC-GAN configured to operate at test or inference time according to one embodiment of the present disclosure.

FIG. 2A is a block diagram of an MC-GAN configured to operate at test or inference time according to one embodiment of the present disclosure. It is assumed for purposes of the present disclosure, that the MC-GAN has been trained as described in this disclosure with respect to FIGS. 1A through 1C and FIGS. 2B through 2D. In particular, as shown in FIG. 2A, MC-GAN 290 performs the following operation:

$$\subset A_G^S \rightarrow \hat{A}_G^O$$

That is, MC-GAN 290 may receive a subset (partial observation) of glyph shapes from an alphabet corresponding to a font and jointly synthesize a full set of ornamented glyphs for the alphabet. Thus, according to one embodiment of the present disclosure, MC-GAN 290 may synthesize a full set of glyphs from partial observations. As shown in FIG. 2A, MC-GAN 290 may further comprise GlyphNet 282 and OrnaNet 284.

According to one embodiment of the present disclosure, GlyphNet 282 may perform the following operation:

$$\subset A_G^S \rightarrow \hat{A}_G^S$$

GlyphNet 282 may further comprise glyph shape generator network $G^S$, which jointly generates all glyph shapes for an alphabet from partial observations.

According to one embodiment of the present disclosure, OrnaNet 284 may perform the following operation:

$$\hat{A}_G^S \rightarrow \hat{A}_G^O$$

In particular, OrnaNet may receive a set of synthesized glyphs from GlyphNet 282 as input and synthesize a full set of ornamented glyphs for the alphabet. As shown in FIG. 2A, OrnaNet 284 may further comprise glyph ornamentation generator network $G^O$, which jointly generates all glyphs with ornamentation for an alphabet from glyph shapes.

Figure 2B:
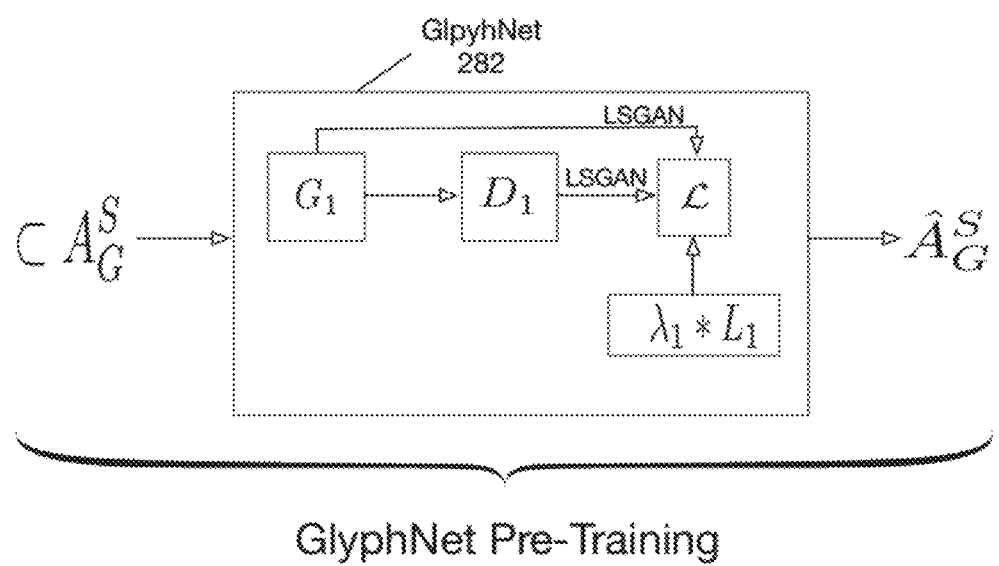
FIG. 2B is a block diagram of a GlyphNet in a pre-training configuration according to one embodiment of the present disclosure.

FIG. 2B is a block diagram of a GlyphNet in a pre-training configuration according to one embodiment of the present disclosure. As will be described in more detail below, according to one embodiment of the present disclosure, GlyphNet 282 is pre-trained prior to performing a joint training phase of MC-GAN 290 (i.e., GlyphNet 282 and OrnaNet 284) (described below). As shown in FIG. 2B, during the pre-training phase, GlyphNet 282 may further comprise shape generator network ($G_1$), shape discriminator network ($D_1$) and loss function module ($\mathcal{L}$). Shape generator network ($G_1$) attempts to synthesize glyph shapes to fool shape discriminator network ($D_1$) that the synthesize glyph shapes originated from the training dataset. On the other hand, shape discriminator network ($D_1$) attempts to discriminate synthesized glyph shapes from glyph shapes originating from the training dataset. Shape discriminator network ($D_1$) and shape generator network ($G_1$) each contribute a respective term to the loss function ($\mathcal{L}$) (as described above). In addition, as shown in FIG. 2B, the loss function ($\mathcal{L}$) also includes an $L_1$ loss term weighted by hyperparameter $\lambda_1$. The particular meaning of the $L_1$ term will be described in detail below.

Figure 2C:
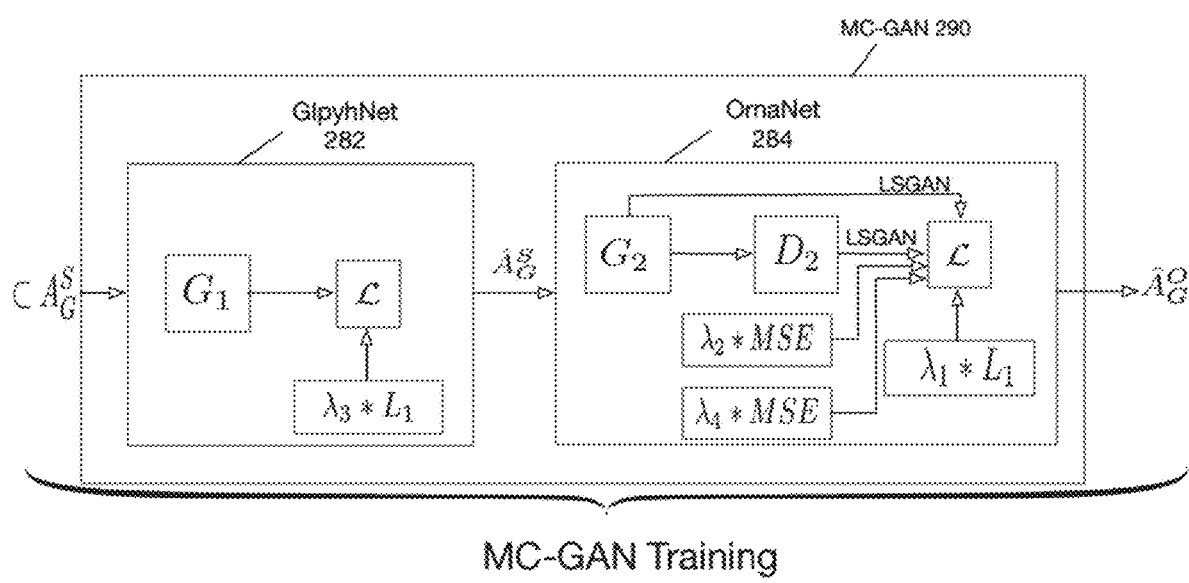
FIG. 2C is a block diagram of an MC-GAN in a joint training configuration according to one embodiment of the present disclosure.

FIG. 2C is a block diagram of an MC-GAN in a joint training configuration according to one embodiment of the present disclosure. In particular, FIG. 2C pertains to the joint training of GlyphNet 282 and OrnaNet 284. During a joint training operation, MC-GAN 290 may perform the following operation:

$$\subset A_G^S \rightarrow \hat{A}_G^O$$

In particular, MC-GAN 290 may receive a subset of glyph shapes (partial observations) and synthesize a full set of ornamented glyphs for the entire alphabet. According to one embodiment of the present disclosure, prior to the joint training of MC-GAN 290, GlyphNet 282 is initialized with the parameters determined during pre-training of GlyphNet 282.

As shown in FIG. 2C, during the joint training phase of MC-GAN 290, GlyphNet 282 may further comprise shape generator network ($G_1$) and loss function module ($\mathcal{L}$) (note that that glyph shape discriminator network is not active during this portion of training). The loss function module ($\mathcal{L}$) in GlyphNet 282 solely comprises an $L_1$ loss term weighted by hyperparameter $\lambda_3$. During the joint training phase of MC-GAN 290, OrnaNet 284 may further comprise ornamentation generator network ($G_2$), ornamentation discriminator network ($D_2$), and loss function module ($\mathcal{L}$).

Ornamentation generator network ($G_2$) attempts to synthesize glyph ornamentation to fool ornamentation discriminator network ($D_2$) that the synthesized ornamented glyphs originated from the training dataset. On the other hand, ornamentation discriminator network ($D_2$) attempts to discriminate synthesized ornamented glyphs from ornamented glyphs shapes originating from the training dataset. Ornamentation discriminator network ($D_2$) and ornamentation generator network ($G_2$) each contribute a respective term to the loss function ($\mathcal{L}$) (as described above). In addition, as shown in FIG. 2C, the loss function ($\mathcal{L}$) may include an $L_1$ loss term weighted by hyperparameter $\lambda_1$, a first mean square error term ("MSE") weighted by hyperparameter $\lambda_1$ and a second MSE term weighted by hyperparameter $\lambda_2$. The particular meaning of the $L_1$ and MSE terms will be described in detail below.

GlyphNet

Figure 2D:
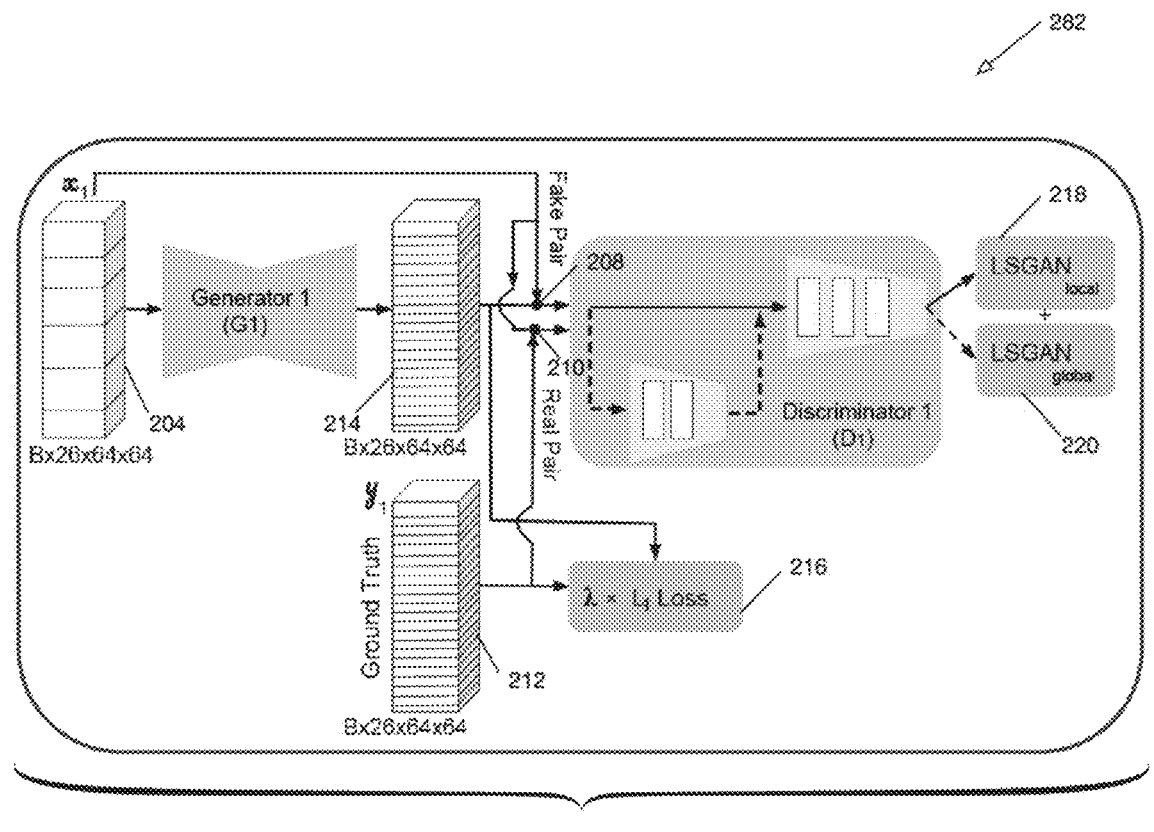
FIG. 2D is a detailed block diagram of a GlyphNet in a pre-training configuration according to one embodiment of the present disclosure.

FIG. 2D is a detailed block diagram of a GlyphNet in a pre-training configuration according to one embodiment of the present disclosure. As will be described in more detail below, once pre-training operation is completed a GlyphNet 282 and OrnaNet 284 may be further trained in a joint configuration (MC-GAN 290). Upon the completion of training, the GlyphNet 282 and OrnaNet 284 may be utilized for an end-to-end configuration to perform generation of fonts/glyph based upon partial observations. The GlyphNet 282 subnetwork may generate a full set of shapes for an alphabet based upon a subset of observed input shape examples for a font. As will be described in more detail below, the OrnaNet subnetwork 284 may operate on the output of the GlyphNet (full set of shapes) to generate a full set of ornamented glyphs.

Generalizing all 26 capital letters of a font from a few example glyphs requires capturing correlations and similarities among source letters and unseen ones. According to one embodiment of the present disclosure, GlyphNet 282 may learn correlations automatically in order to generate an entire set of stylistically similar glyphs from partial observations as previously defined comprising a subset of glyphs for an entire alphabet.

Due to the style similarity among all content images, one input channel is added for each individual glyph resulting in a "glyph stack" in both the input and generated output. A basic tiling of all 26 glyphs into a single image, however, fails to capture correlations among them specifically for those far from each other along the image length. This occurs due to the smaller size of convolution receptive fields than the image length within a reasonable number of convolutional layers.

In order to solve this, correlation between different glyphs are learned across network channels in order to transfer their style automatically. This is achieved via a particular architectural design of generator ($G_1$) 204, which utilizes six ResNet Blocks. In particular, according to one embodiment of the present disclosure, all glyphs in an alphabet (e.g., 26) are stacked together in a single convolutional channel in the input allowing the network to learn both spatial correlations within a glyph as well as across glyphs. A full architectural specification of GlyphNet 282 is described in detail below.

According to one embodiment of the present disclosure 64×64 glyphs in greyscale are utilized resulting in an input tensor dimension of B×26×64×64 204 for the 26 capital English alphabets, with B indicating batch size, and an output tensor dimension of B×26×64×64 214. According to one embodiment of the present disclosure, shape discriminator network $D_1$ comprises both a local discriminator 218 and a global discriminator 220. Utilizing the PatchGAN model, a 21×21 local discriminator 218 is applied employing three convolutional layers on top of the generated output stack in order to discriminate between real and fake local patches resulting in a receptive field size equal to 21. In parallel, two extra convolutional layers are added to operate as global discriminator 220, resulting in a receptive field covering the whole image to distinguish between realistic font images and generated ones. Although FIG. 2D shows both local discriminator 218 and global discriminator 220 within a single discriminator network $D_1$, it will be understood that other arrangements are possible and local discriminator 218 and global discriminator 220 may not be combined in a single network.

According to one embodiment in order to stabilize GAN training two least squares GAN (LSGAN) loss functions are respectively employed for the local and global discriminators (218, 220) with an $L_1$ loss penalizing deviation of generated images $G_1(x_1)$ from their ground truth $y_1$:

$$\mathcal{L}(G_1) = \lambda \mathcal{L}_{L_1}(G_1) + \mathcal{L}_{LSGAN}(G_1, D_1) = \mathbb{E}_{x_1, y_1 \sim p_{data}(x_1, y_1)}[\|y_1 - {}_1(x_1)\|_1] +$$
$$\mathbb{E}_{y_1 \sim p_{data}(y_1)}[(D_1(y_1) - 1)^2] + \mathbb{E}_{x_1 \sim p_{data}(x_1)}[D_1(G_1(x_1))^2]$$

where $$\mathcal{L}_{LSGAN}(G_1, D_1) = \mathcal{L}_{LSGAN}^{local}(G_1, D_1) + \mathcal{L}_{LSGAN}^{global}(G_1, D_1)$$

In order to carry out the above loss functions, as shown in FIG. 2D, fake-pair concatenation node 208 performs concatenation of input tensor 204 and synthesized output tensor 214, which is provided to discriminator $D_1$. Similarly, real-pair concatenation node 210 performs concatenation of input tensor 204 and ground truth tensor 212, which is provided to discriminator $D_1$. $L_1$ loss block 216 generates an $L_1$ loss metric based upon ground truth tensor 212 and synthesized output tensor 214.

According to one embodiment of the present disclosure, the GlyphNet 282 may be trained on a collected 10K font data set where in each training iteration, x, includes a randomly chosen subset of $y_1$ glyphs with the remaining input channels zeroed out. For purposes of the present disclosure, this trained model is referred to as $G'_1$.

OrnaNet

According to one embodiment of the present disclosure, a second sub-network, OrnaNet 284, is designed to transfer ornamentation of the few observed letters to the grayscale glyphs through another conditional GAN network consisting of a generator, $G_2$, and a discriminator, $D_2$. Feeding in the glyphs as input images, $x_2$, this network generates outputs, $G_2(x_2)$, enriched with desirable color and ornamentation.

According to one embodiment of the present disclosure OrnaNet 284 and GlyphNet 282 may utilize a similar architecture, but may differ in the dimension and type of inputs and outputs, as well as in how broad vs. specific the respective models are in generating images with a particular style. While GlyphNet 282 is designed to generalize glyph correlations across all our training fonts, OrnaNet 284 may be specialized to apply only the specific ornamentation observed in a given observed font. Accordingly, OrnaNet may be trained only on the small number of observations available. Moreover, inputs and outputs of OrnaNet 284 may include a batch of images with three RGB channels where the input channels are identical copies of the grayscale glyphs.

MC-GAN (End-to-End) Network

Figure 2E:
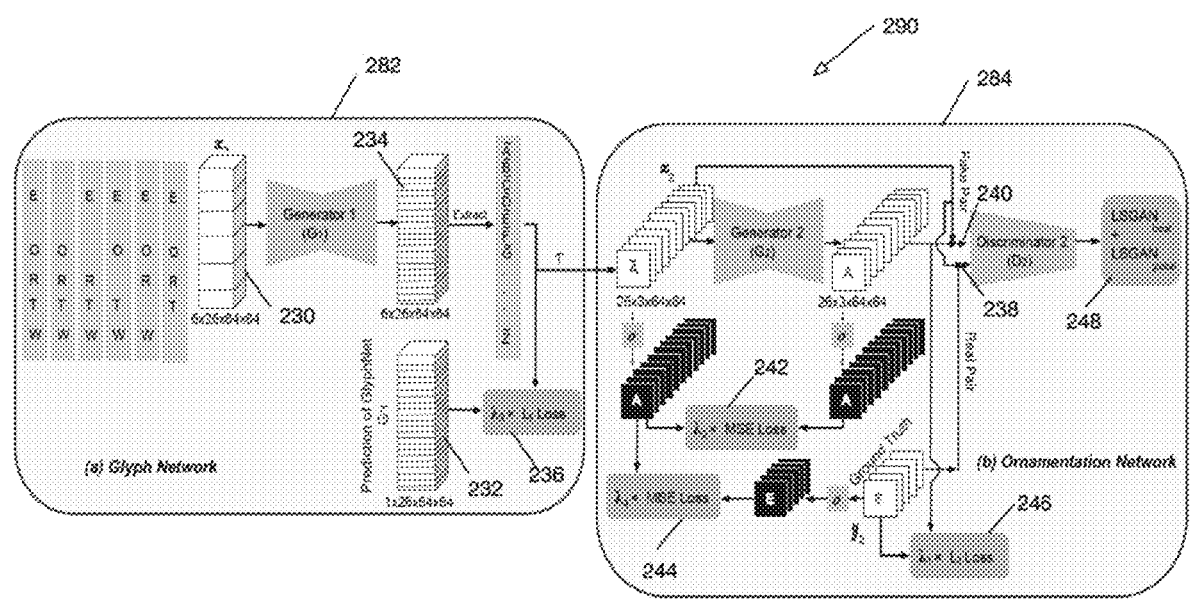
FIG. 2E is a detailed block diagram of an MC-GAN network comprising a GlyphNet and an OrnaNet in a training configuration according to one embodiment of the present disclosure.

FIG. 2E is a detailed block diagram of an MC-GAN network comprising a GlyphNet and an OrnaNet in a training configuration according to one embodiment of the present disclosure. MC-GAN 290 may operate to generalize both style and ornamentation of observed glyphs to unobserved ones.

Referring to FIG. 2E, MC-GAN 290 operating in a training configuration may further comprise GlyphNet 282 and OrnaNet 284. GlyphNet 282 may further comprise generator $G_1$ and $L_1$ loss module 236. $L_1$ loss module 236 may operate to compare the ground truth 232, which is a tensor of dimension 1×26×64×64 with the output of generator $G_1$ after an extract operation is performed (described below).

Leave One Out Sampling

All glyphs corresponding to an alphabet (e.g., 26 for lowercase characters only) including the observed ones are processed through the pre-trained GlyphNet 282 and fed to OrnaNet 284 (initialized with random weights) to be fine-tuned. According to one embodiment of the present disclosure, a leave-one-out approach is utilized. Thus, as shown in FIG. 2E, according to one embodiment of the present disclosure, an input tensor of dimension (n+1)×26×64×64 is provided to generator $G_1$ in GlyphNet 282, where n refers to the number of observed glyphs. The parameter n+1 arises because the leave one out sampling creates a batch where 0-n letters are left out. That is, the leave-one-out approach cycles through all possible unobserved letters. For example, given 5 observed letters of the word TOWER shown in FIG. 2E, the first 4 letters 'T', 'O', 'W', 'E' are assembled into a 1×26×64×64 input stack and fed to the pre-trained GlyphNet 282 to generate all 26 letters. Then, one fake glyph, 'R', not included in the input stack is extracted. This process may then be repeated to generate all of the 5 observed letters ('T', 'O', 'W', 'E', 'R') from the pre-trained GlyphNet.

Similarly, continuing with the same example, the 21 remaining letters ('A'-'D', 'F'-'N', 'P'-'Q', 'R'-'V' and 'X'-'Z') are extracted from the pre-trained GlyphNet 282 by feeding in a 1×26×64×64 input stack filled with all 5 observed letters simultaneously with the remaining channels zeroed out. The entire process may be summarized by passing 6 input stacks each with dimension 1×26×64×64 through GlyphNet as a batch, extracting the relevant channel from each output stack, and finally concatenating them into a single 1×26×64×64 output.

Reshape Transformation

According to one embodiment of the present disclosure, a reshape transformation followed by a grey-scale channel repetition may then be performed symbolized by the symbol T. In particular, according to one embodiment of the present disclosure, the grey-scale channel repetition repeats the tensor object generated by the reshape operation as three separate channels in a new input tensor with dimension 3×64×64, which is fed as a batch, $x_2$ to OrnaNet 284. This leave-one-out approach enables OrnaNet 284 to generate high quality stylized letters from coarse generated glyphs.

MC-GAN Loss Function

According to one embodiment of the present disclosure, to stabilize adversarial training of the OrnaNet 284 generator ($G_2$) and discriminator ($D_2$), an LSGAN loss may be employed coupled with an $L_1$ loss function on generated images of the observed letters, $x_2$, and their ground truth, $y_2$. In addition, according to one embodiment of the present disclosure, to generate a set of color images with clean outlines, the mean square error ("MSE") between binary masks of the outputs and inputs of the generator in OrnaNet 284 which are fake color letters, $G_2(x_2)$, and fake gray-scale glyphs, $x_2$, respectively may be minimized using associated loss functions. According to one embodiment of the present disclosure, binary masks may be obtained by passing images through a sigmoid function, indicated as a in FIG. 2E.

Thus, according to one embodiment of the present disclosure, the loss function applied on top of the OrnaNet in the end-to-end scenario may be written as:

$$\mathcal{L}(G_2) = \mathcal{L}_{LSGAN}(G_2, D_2) + \lambda_1 \mathcal{L}_{L_1}(G_2) + \lambda_2 \mathcal{L}_{MSE}(G_2) =$$
$$\mathbb{E}_{y_2 \sim P_{data}(y_2)}[(D_2(y_2) - 1)^2] + \mathbb{E}_{x_2 \sim P_{data}(x_2)}[(D_2(G_2(x_2)))^2] +$$
$$\mathbb{E}_{x_2, y_2 \sim P_{data}(x_2, y_2)}[\lambda_1 \|y_2 - G_2(x_2)\|_1 + \lambda_2(\sigma(y_2) - \sigma(G_2(x_2)))]$$

where $x_2 = T(G_1(x_1))$ and $$\mathcal{L}_{LSGAN}(G_2, D_2) = \mathcal{L}_{LSGAN}^{local}(G_2, D_2) + \mathcal{L}_{LSGAN}^{global}(G_2, D_2) +$$

According to one embodiment of the present disclosure, in the final end-to-end training of GlyphNet 282 and Orna-Net 284, the GlyphNet discriminator ($D_1$) is not invoked. Instead, OrnaNet 284 plays the role of a loss function by backpropagating the gradients of the objective (above equation) to improve style of the generated glyphs.

Adding a weighted $L_1$ loss on top of the generator in GlyphNet 282 ($G_1$) also penalizes deviations from the predictions of the pre-trained GlyphNet 282 (G'). According to one embodiment of the present disclosure, an MSE loss function may be added between binary masks of fake versions of the observed glyphs ($T(G_1(x_1))$), and masks of their corresponding ground truth glyphs, $y_2$. In sum, the gradients of the following loss functions are passed through GlyphNet 282 in addition to the gradient originating from OrnaNet 284:

$$\mathcal{L}(G_1) = \lambda_3 \mathcal{L}_{w, L_1}(G_1) + \lambda_4 \mathcal{L}_{MSE}(G_1) = \mathbb{E}_{x_1 \sim P_{data}(x_1), y_2 \sim P_{data}(y_2)}$$
$$\left[ \lambda_3 \sum_{i=1}^{26} w_i x |G_1^i(x_1) - G_1'^i(x_1)| + \lambda_4(\sigma(y_2) - \sigma(T(G_1(x_1))))^2 \right]$$

where $w_i$ allows for the application of different weights to observed vs. unobserved glyphs. According to one embodiment of the present disclosure, a ratio between different terms in the referenced loss functions (previous two equations) is defined based upon hyperparameters $\lambda_1$-$\lambda_4$.

In particular, the above-described loss functions may be implemented in an MC-GAN network as shown in FIG. 2E as follows. OrnaNet 284 may further comprise generator $G_2$, discriminator $D_2$, which utilizes $LSGAN_{local}$ and $LSGAN_{global}$ loss functions 248, $L_1$ loss module 246, and MSE loss modules 242 and 244. A first MSE loss function 242 with hyperparameter $\lambda_2$ enforces the condition that generator $G_2$ should not change the mask. Note that the a functions shown in FIG. 2E convert a color image to black and white. Second MSE loss function 244 with hyperparameter $\lambda_4$ enforces that condition that the output of Glyph-Net 282 should match the mask of the ground truth after a mask is applied. $L_1$ loss module 246 enforces the condition that the output of generator $G_2$ should match the ground truth.

Network Architecture

According to one embodiment of the present disclosure, the generator (encoder-decoder) architecture is based upon J. Johnson, A. Alahi, and L. Fei-Fei. Perceptual losses for real-time style transfer and super-resolution. In European Conference on Computer Vision, pages 694-711. Springer, 2016. 2, 3, 16. A Convolution-BatchNorm-ReLU consisting of k channels is represented using CRk, a Convolution-BatchNorm layer with Ck, a Convolution-BatchNorm-ReLU-Dropout with CRDk, and a Convolution-LeakyReLU with CLk. In the above notations, all input channels are convolved to all output channels in each layer.

According to one embodiment of the present disclosure, another Convolution-BatchNorm-ReLU block may be employed in which each input channel is convolved with its own set of filters and denote it by CR26k, where 26 shows the number of such groups. Dropout rate during training is 50% while ignored at test time. Negative slope of the Leaky ReLU is also set to 0.2.

Generators Architecture

According to one embodiment of the present disclosure, encoder architecture in GlyphNet is:
CR2626-CR64-CR192-CR576-(CRD576-C576)-(CRD576-CR576)-(CRD576-C576) where convolutions are down-sampling by a factor of 1-1-2-2-1-1-1-1-1-1, respectively, and each (CRD576-C576) pair is one ResNet Block.

According to one embodiment of the present disclosure, the encoder in OrnaNet follows a similar network architecture except for in its first layer where the CR2626 has been eliminated.

The decoder architecture in both GlyphNet and OrnaNet is as follows:
(CRD576-C576)-(CRD576-C576)-(CRD576-C576)-CR192-CR64 each up-sampling by a factor of 1-1-1-1-1-1-2-2, respectively. Another Convolution layer with 26 channels followed by a Tan h unit is then applied in the last layer of the decoder.

Discriminators Architecture

According to one embodiment of the present disclosure, the GlyphNet and OrnaNet discriminators, $D_1$ and $D_2$, consist of a local and global discriminator where weights of the local discriminator are shared with the latter. The local discriminator consists of CL64-CL128 followed by a convolution mapping its 128 input channels to one output. Convolutions here are down-sampled by a factor of 2-1-1, respectively. The global discriminator has two additional layers before joining the layers in the local discriminator as CR52-CR52 each down-sampling by a factor of 2. Receptive field size of the local discriminator is 21 while global discriminator covers a larger area than the 64 pixels in the image domain, and thus can capture a global information from each image.

Fonts Dataset

Figure 3A:
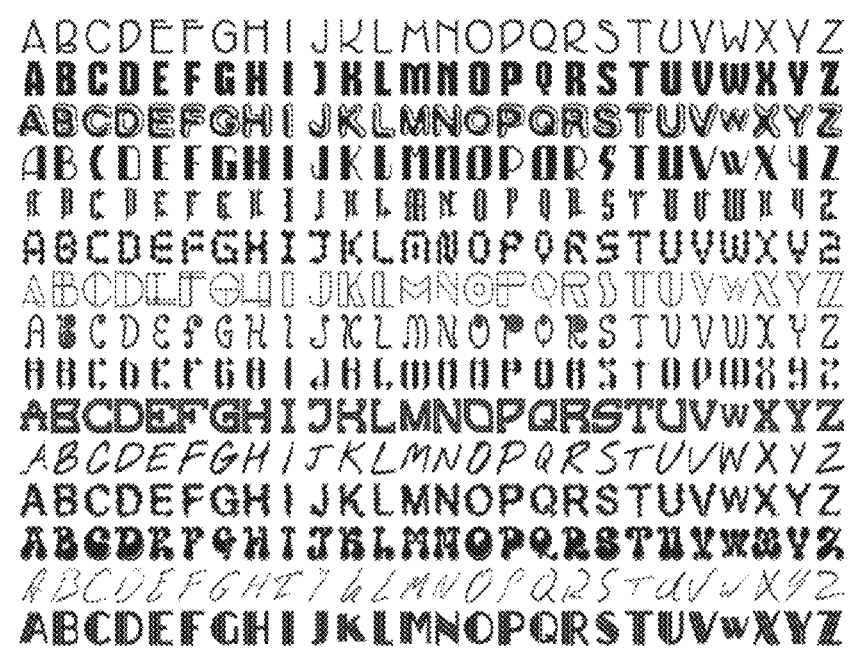

According to one embodiment of the present disclosure, a dataset including 10K grayscale Latin fonts each with 26 capital letters was assembled. The dataset was processed by determining a bounding box around each glyph and resizing it so that the larger dimension reaches 64 pixels. A padding operation is then performed to create 64×64 glyphs. FIG. 3A shows a few exemplar fonts in greyscale from the dataset according to one embodiment of the present disclosure. These fonts contain rich information about inter-letter correlations in font styles, but only encode glyph outlines and not font ornamentations. To create a baseline dataset of ornamented fonts, random color gradients and outlining may be applied to the gray-scale glyphs, two random color gradients on each font, resulting in a 20K color font data set. FIG. 3B shows a few examples of ornamented fonts according to one embodiment of the present disclosure.

The size of this data set can be arbitrarily increased through generating more random colors. These gradient fonts do not have the same distribution as in-the-wild ornamentations but can be used for applications such as network pre-training.

Experiments and Results

Various experiments were performed with the following hyperparameter settings:
$\lambda_1$=300, $\lambda_2$=300 if epoch<200 and $\lambda_2$=3 otherwise
$\lambda_3$=10, $\lambda_4$=300 while $w_i$=10 if i is an observed glyph and $w_i$=1 otherwise According to one embodiment of the present disclosure, a baseline image-to-image translation network was implemented. In this baseline approach, channel-wise letters in input and output stacks with dimensions B×78×64×64 were considered, where B stands for training batch size and 78 corresponds to the 26 RGB channels. The input stack was given with "observed" color letters while all letters were generated in the output stack.

According to one embodiment of the present disclosure, the network was trained on color font data set where randomly chosen color gradients were applied on each grayscale font. Feeding in a random subset of RGB letters of an arbitrary font into this model during test time, the network was expected to generate stylistically similar 26 letters.

Figure 3C:
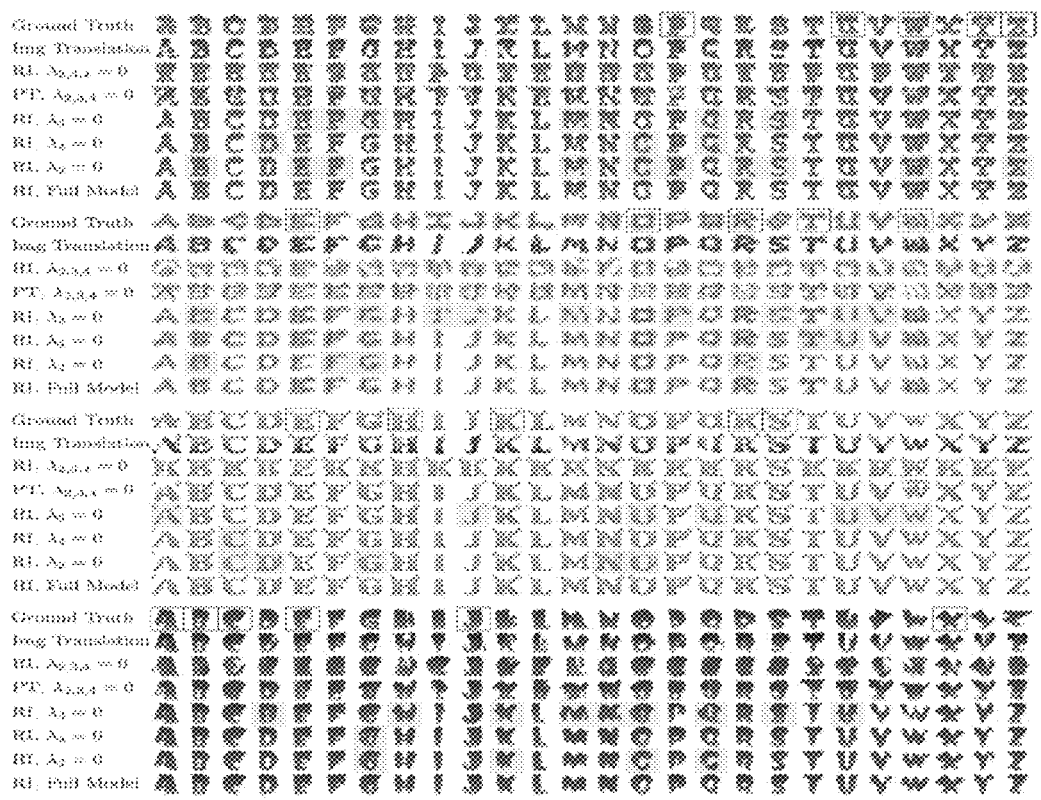
FIG. 3C is an ablation study utilizing MC-GAN model components according to one embodiment of the present disclosure.

FIG. 3C is an ablation study utilizing MC-GAN model components according to one embodiment of the present disclosure. For each exemplar font, the following items are shown:

Ground Truth ($1^{st}$ row)
Observed Letters (Red squares in $1^{st}$ row)
Predictions of the baseline image translation network ($2^{nd}$ row)
Predictions of the MC-GAN model with randomly initialized (RI) OrnaNet and $\lambda_2$=$\lambda_3$=$\lambda_4$=0 ($3^{rd}$ row)
Pre-trained (PT) OrnaNet weights and $\lambda_2$=$\lambda_3$=$\lambda_4$=0 ($4^{th}$ row)
Selectively disabled loss terms (rows 5-7)
Full end-to-end MC-GAN model (bottom row)
Style transfer improvements by $\lambda_3$ are highlighted in blue and degradation in predictions by omitting each individual regularizer is highlighted in red As illustrated in FIG. 3C, while the network has learned rough aspects of glyph structure, the predictions do not follow a consistent color or ornamentation scheme, as the network is not able to effectively specialize for the provided ornamentation style. Similar artifacts are observed even when evaluating on a test set derived from a simplified color-gradient dataset.

Figure 3D:
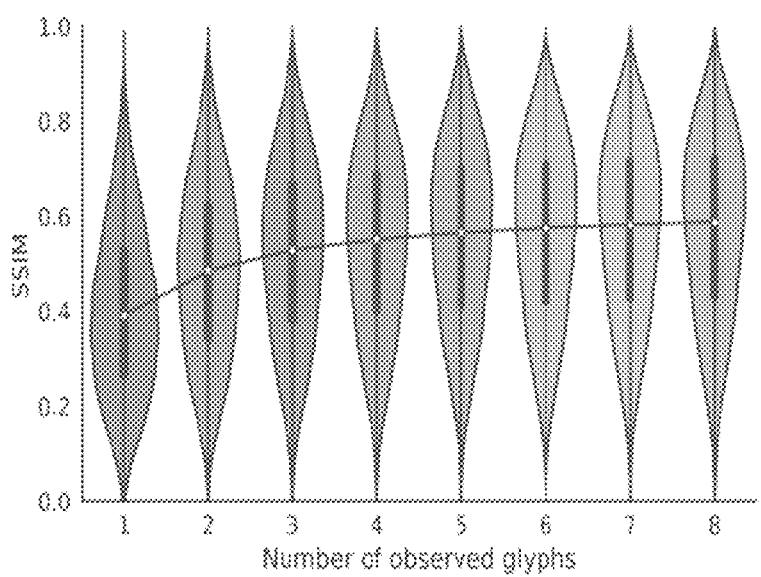
FIG. 3D is a plot showing the effect of number of observed glyphs on the quality of GlyphNet predictions according to one embodiment of the present disclosure.

FIG. 3D is a plot showing the effect of number of observed glyphs on the quality of GlyphNet predictions according to one embodiment of the present disclosure. The red line shown in the plot is passing through the median of each distribution.

Perceptual Evaluation

To evaluate the performance of the MC-GAN model, the generated letters of the MC-GAN were compared against the output of the patch-based synthesis method. Since the patch-based synthesis model was designed only for transferring text decorations on clean glyphs, it is not fully comparable with the MC-GAN approach which synthesizes unobserved letters. To explore the patch-based synthesis model, the predictions of a pretrained GlyphNet was used as the input to this algorithm. Moreover, the patch-based synthesis model transfers stylization from only one input decorated glyph, while the MC-GAN approach uses all observed examples simultaneously. Therefore, to enable a fair comparison in transferring ornamentations, the patch-based synthesis model was allowed to choose the most similar glyph among the observed instances to the generated glyph mask using a simple image-space distance metric.

The output of both methods was evaluated on 33 font examples, downloaded from the web. In particular, 11 people were asked to choose which character set they preferred when presented with the observed letters and the full glyph results of both methods.

Overall users preferred the result of the MC-GAN method 80.0% of the time. FIG. 4A through 4D visualize the comparison of the MC-GAN model with the text-transfer method on a set of examples according to one embodiment of the present disclosure. In particular, the ground truth and given letters (first rows), predictions of the text effect transfer method were applied on top of the glyphs synthesized by our GlyphNet (second rows), and predictions of an MC-GAN model (last rows). The two best and two worst scoring results for each method are shown on the top and bottom examples. The text transfer approach is designed to generate text patterns on clean glyphs but mostly fails to transfer style given the synthesized gray-scale letters. In addition, due to their dependency on a patch matching based algorithm, the text transfer approach often cannot transfer style correctly when the shapes of the given and new letters are not very similar.

Integration in Computing System and Network Environment

Figure 5A:
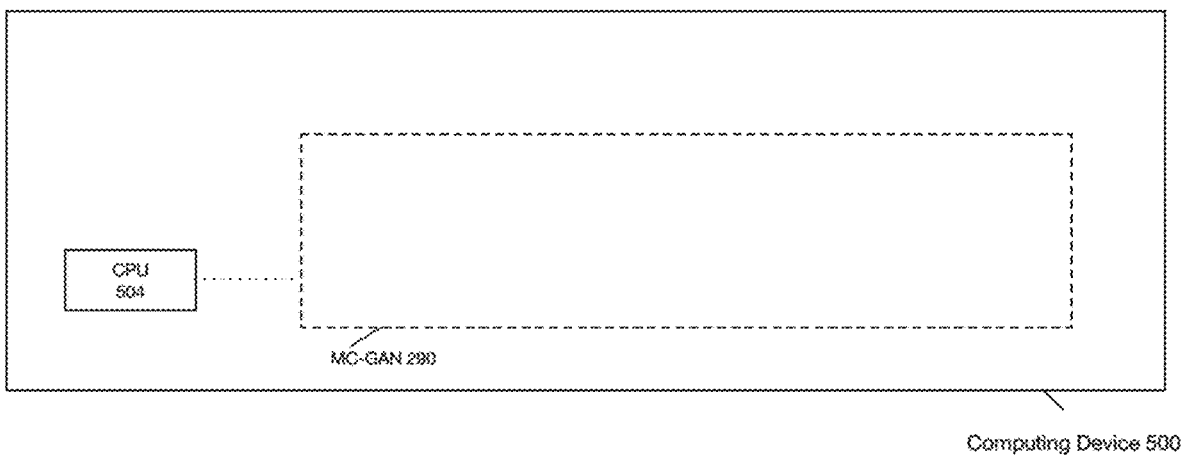
FIG. 5A illustrates an example computing system that executes a MC-GAN network according to one embodiment of the present disclosure.

FIG. 5A illustrates an example computing system that executes a MC-GAN network 290 according to one embodiment of the present disclosure. As depicted in FIG. 5A, computing device 500 may include CPU 504 that executes one or more processes to implement MC-GAN network 290. In particular, CPU 504 may be further configured via programmatic instructions to execute MC-GAN network 290 (as variously described herein). Other componentry and modules typical of a computing system, such as, for example a co-processor, a processing core, a graphics processing unit, a mouse, a touch pad, a touch screen, display, etc., are not shown but will be readily apparent. Numerous computing environment variations will be apparent in light of this disclosure. Computing device 500 can be any stand-alone computing platform, such as a desk top or work station computer, laptop computer, tablet computer, smart phone or personal digital assistant, game console, set-top box, or other suitable computing platform.

Figure 5B:
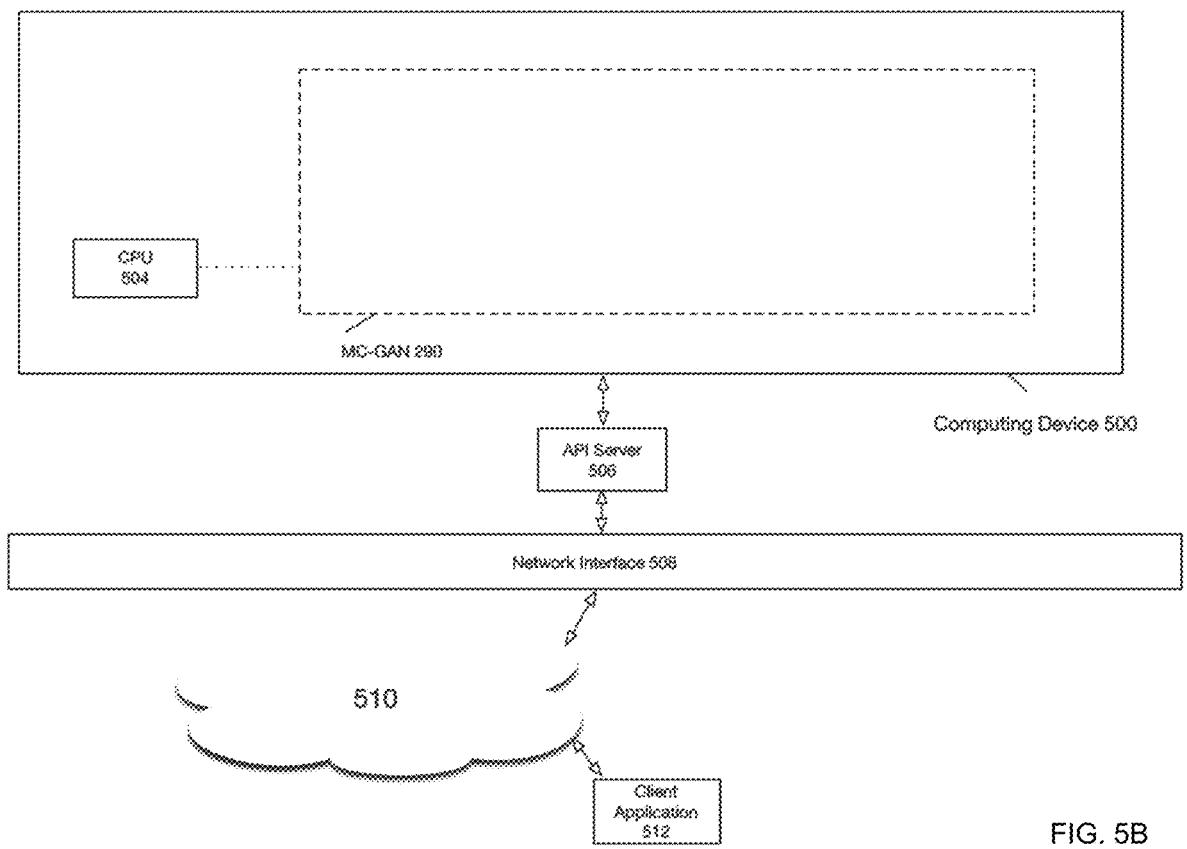
FIG. 5B illustrates an example integration of a MC-GAN network into a network environment according to one embodiment of the present disclosure.

FIG. 5B illustrates an example integration of a MC-GAN network into a network environment according to one embodiment of the present disclosure. As depicted in FIG. 5B, computing device 500 may be collocated in a cloud environment, data center, local area network ("LAN") etc. Computing device 500 shown in FIG. 5B is structured identically to the example embodiment described with respect to FIG. 5A. As shown in FIG. 5B, client application 512 may interact with computing device 500 via network 510. In particular, client application 512 may make requests and receive responses via API calls received at API server 506, which are transmitted via network 510 and network interface 508.

It will be understood that network 510 may comprise any type of public or private network including the Internet or LAN. It will be further readily understood that network 510 may comprise any type of public and/or private network including the Internet, LANs, WAN, or some combination of such networks. In this example case, computing device 500 is a server computer, and client application 512 may be any personal computing platform As will be further appreciated, computing device 500, whether the one shown in FIG. 5A or 5B, includes and/or otherwise has access to one or more non-transitory computer-readable media or storage devices having encoded thereon one or more computer-executable instructions or software for implementing techniques as variously described in this disclosure. The storage devices may include any number of durable storage devices (e.g., any electronic, optical, and/or magnetic storage device, including RAM, ROM, Flash, USB drive, on-board CPU cache, hard-drive, server storage, magnetic tape, CD-ROM, or other physical computer readable storage media, for storing data and computer-readable instructions and/or software that implement various embodiments provided herein.) Any combination of memories can be used, and the various storage components may be located in a single computing device or distributed across multiple computing devices. In addition, and as previously explained, the one or more storage devices may be provided separately or remotely from the one or more computing devices. Numerous configurations are possible.

In some example embodiments of the present disclosure, the various functional modules described herein and specifically training and/or testing of network 340, may be implemented in software, such as a set of instructions (e.g., HTML, XML, C, C++, object-oriented C, JavaScript, Java, BASIC, etc.) encoded on any non-transitory computer readable medium or computer program product (e.g., hard drive, server, disc, or other suitable non-transitory memory or set of memories), that when executed by one or more processors, cause the various creator recommendation methodologies provided herein to be carried out.

In still other embodiments, the techniques provided herein are implemented using software-based engines. In such embodiments, an engine is a functional unit including one or more processors programmed or otherwise configured with instructions encoding a creator recommendation process as variously provided herein. In this way, a software-based engine is a functional circuit.

In still other embodiments, the techniques provided herein are implemented with hardware circuits, such as gate level logic (FPGA) or a purpose-built semiconductor (e.g., application specific integrated circuit, or ASIC). Still other embodiments are implemented with a microcontroller having a processor, a number of input/output ports for receiving and outputting data, and a number of embedded routines by the processor for carrying out the functionality provided herein. In a more general sense, any suitable combination of hardware, software, and firmware can be used, as will be apparent. As used herein, a circuit is one or more physical components and is functional to carry out a task. For instance, a circuit may be one or more processors programmed or otherwise configured with a software module, or a logic-based hardware circuit that provides a set of outputs in response to a certain set of input stimuli. Numerous configurations will be apparent.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

FURTHER EXAMPLE EMBODIMENTS

The following examples pertain to further embodiments, from which numerous permutations and configurations will be apparent.

Example 1 is a method for synthesizing a font, the method comprising receiving a partial observation of glyph shapes, generating a full set of glyph shapes from said partial observation, and, processing said full set of glyph shapes to generate a full set of ornamented glyphs.

Example 2 is the method according to Example 1, wherein said partial observation of glyph shapes comprises a black and white mask for a glyph.

Example 3 is the method according to any of Examples 1-2, wherein generating a full set of glyph shapes from said partial observation comprises processing said partial observation by a first network, the first network trained using a conditional generative adversarial process to synthesize glyph shapes.

Example 4 is the method according to Example 3, wherein a pre-training operation is performed on said first network using a loss function comprising a combination of a generative adversarial loss and an L1 loss.

Example 5 is the method according to any of Examples 3-4, wherein processing said full set of glyph shapes to generate a full set of ornamented glyphs comprises processing said full set of glyph shapes by a second network, the second network trained using a conditional adversarial process to synthesize glyph ornamentation.

Example 6 is the method according to Example 5, wherein a training operation is performed on the first and second networks in an end-to-end configuration using a combination of the generative adversarial loss function, and L1 loss function and at least one mean square error ("MSE") loss function on said second network.

Example 7 is the method according to any of Examples 1-2, wherein said full set of ornamented glyphs is generated simultaneously.

Example 8 is a system for synthesizing a font comprising a first network for generating a full set of glyph shapes from a partial observation of glyph shapes, a second network for generating a full set of ornamented glyph shapes from a set of glyph shapes, and, a coupling module between said first and second network for performing a reshape and grey-scale repetition function.

Example 9 is the system according to Example 8, wherein said partial observation of glyph shapes comprises a black and white mask for a glyph.

Example 10 is the system according to any of Examples 8-9, wherein said first network is trained using a conditional generative adversarial process to synthesize glyph shapes.

Example 11 is the system according to any of Examples 8-9, wherein said second network is trained using a conditional adversarial process to synthetically perform ornamentation of glyph shapes.

Example 12 is the system according to Example 11, wherein a pre-training operation is performed on said first network using a loss function comprising a combination of a generative adversarial loss and an L1 loss.

Example 13 is the system according to any of Examples 8-9, wherein a training operation is performed on first and second networks in an end-to-end configuration using a combination of a generative adversarial loss function, and L1 loss function and at least one mean square error ("MSE") loss function on said second network.

Example 14 is the system according to any of Examples 8-9, wherein said full set of ornamented glyphs is generated simultaneously.

Example 15 is a computer program product including one or more non-transitory machine-readable mediums encoded with instructions that when executed by one or more processors cause a process to be carried out for synthesizing a font comprising, the process comprising receiving a partial observation of glyph shapes, generating a full set of glyph shapes from said partial observation, and, processing said full set of glyph shapes to generate a full set of ornamented glyphs.

Example 16 is the computer program product according to Example 15, wherein said partial observation of glyph shapes comprises a black and white mask for a glyph.

Example 17 is the computer program product according to any of Examples 15-16, wherein generating a full set of glyph shapes from said partial observation comprises processing said partial observation by a first network trained using a conditional generative adversarial process to synthesize glyph shapes.

Example 18 is the computer program product according to Example 17, wherein a pre-training operation is performed on said first network using a loss function comprising a combination of the generative adversarial loss and L1 loss.

Example 19 is the computer program product according to any of Examples 17-18, wherein processing said full set of glyph shapes to generate a full set of ornamented glyphs comprises processing said full set of glyph shapes by a second network, trained using a conditional adversarial process to synthesize glyph ornamentation.

Example 20 is the computer program product according to Example 19, wherein a training operation is performed on the first and second networks in an end-to-end configuration using a combination of a generative adversarial loss function, and L1 loss function and at least one mean square error ("MSE") loss function on said second network.

What is claimed is:

1. A method for synthesizing a font, the method comprising:
    receiving a partial observation of glyph shapes;
    generating a full set of glyph shapes by processing said partial observation using a first network that is trained to synthesize glyph shapes; and,
    generating a full set of ornamented glyphs by processing said full set of glyph shapes using a second network that is trained to synthesize glyph ornamentation using a conditional adversarial process.

2. The method according to claim 1, wherein said partial observation of glyph shapes comprises a black and white mask for a glyph.

3. The method according to claim 1, wherein said first network is trained using a conditional generative adversarial process.

4. The method according to claim 3, wherein a pre-training operation is performed on said first network using a loss function comprising a combination of a generative adversarial loss and an $L_1$ loss.

5. The method according to claim 1, wherein
    said first network is trained using a conditional generative adversarial process;
    and
    a training operation is performed on said first and second networks in an end-to-end configuration using a combination of a generative adversarial loss function, an $L_1$ loss function and at least one mean square error ("MSE") loss function.

6. The method according to claim 1, wherein said full set of ornamented glyphs is generated simultaneously.

7. A system for synthesizing a font, the system comprising:
    a first network that is trained to generate a full set of glyph shapes from a partial observation of glyph shapes;
    a second network that is trained using a conditional adversarial process to generate a full set of ornamented glyph shapes by synthetically performing ornamentation of said full set of glyph shapes; and,
    a coupling module between said first and second network for performing a reshape and grey-scale repetition function on said full set of glyph shapes generated by said first network.

8. The system according to claim 7, wherein said partial observation of glyph shapes comprises a black and white mask for a glyph.

9. The system according to claim 7, wherein said first network is trained using a conditional generative adversarial process.

10. The system according to claim 7, wherein a pre-training operation is performed on said first network using a loss function comprising a combination of a generative adversarial loss and an $L_1$ loss.

11. The system according to claim 7, wherein a training operation is performed on said first and second networks in an end-to-end configuration using a combination of a generative adversarial loss function, an $L_1$ loss function and at least one mean square error ("MSE") loss function.

12. The system according to claim 7, wherein said full set of ornamented glyphs is generated simultaneously.

13. A computer program product including one or more non-transitory machine-readable mediums encoded with instructions that when executed by one or more processors cause a process to be carried out for synthesizing a font, the process comprising:
    receiving a partial observation of glyph shapes;
    generating a full set of glyph shapes by processing said partial observation using a first network that is trained to synthesize glyph shapes using a conditional generative adversarial process, wherein a pre-training operation is performed on said first network using a loss function comprising a combination of a generative adversarial loss and an $L_1$ loss; and,
    generating a full set of ornamented glyphs by processing said full set of glyph shapes using a second network that is trained to synthesize glyph ornamentation.

14. The computer program product according to claim 13, wherein said partial observation of glyph shapes comprises a black and white mask for a glyph.

15. The computer program product according to claim 13, wherein said second network is trained using a conditional adversarial process.

16. The computer program product according to claim 13, wherein
    said second network is trained using a conditional adversarial process; and
    a training operation is performed on said first and second networks in an end-to-end configuration using a combination of a generative adversarial loss function, an $L_1$ loss function and at least one mean square error ("MSE") loss function.

* * * * *